US012804308B2

(12) United States Patent
Bullimore et al.

(10) Patent No.: US 12,804,308 B2
(45) Date of Patent: Nov. 17, 2026

(54) COAXIAL LOUDSPEAKER USES WAVEGUIDE STRUCTURES TO SHAPE HOW SOUND SPREADS OUT CROSS REFERENCE TO RELATED APPLICATIONS

(71) Applicant: Tymphany HK Limited, Wanchai (HK)

(72) Inventors: George Albert Bullimore, Taipei City (TW); Christoph von Hellermann, Taipei City (TW); Paula Piemolini Jardim, Taipei City (TW); Zhi Li, Taipei City (TW); Emma Jane Ridley, Taipei City (TW); Anthony Ian Northover, Taipei City (TW)

(73) Assignee: TYMPHANY HK LIMITED, Wanchai (HK)

(*) Notice: Subject to any disclaimer, the term of this patent is extended or adjusted under 35 U.S.C. 154(b) by 196 days.

(21) Appl. No.: 18/930,220

(22) Filed: Oct. 29, 2024

(65) Prior Publication Data

US 2025/0142248 A1 May 1, 2025

Related U.S. Application Data

(60) Provisional application No. 63/595,057, filed on Nov. 1, 2023.

(51) Int. Cl.
*H04R 1/24* (2006.01)
*H04R 7/14* (2006.01)
*H04R 9/02* (2006.01)
*H04R 9/06* (2006.01)

(52) U.S. Cl.
CPC ................. *H04R 1/24* (2013.01); *H04R 7/14* (2013.01); *H04R 9/025* (2013.01); *H04R 9/06* (2013.01)

(58) Field of Classification Search
CPC . H04R 1/24; H04R 7/14; H04R 9/025; H04R 9/06; H04R 2201/34; H04R 1/345; H04R 1/30; H04R 9/063; H04R 1/26
See application file for complete search history.

(56) References Cited

U.S. PATENT DOCUMENTS

2017/0048610 A1* 2/2017 Baird ....................... H04R 1/30
2018/0367888 A1* 12/2018 Baird ....................... H04R 9/06

FOREIGN PATENT DOCUMENTS

CN 207117931 U * 3/2018 ............... H04R 9/06

* cited by examiner

*Primary Examiner* — Angelica M Mckinney
(74) *Attorney, Agent, or Firm* — MUNCY, GEISSLER, OLDS & LOWE, P.C.

(57) ABSTRACT

A coaxial loudspeaker including first and second driver units that individually radiate sound from a same axis, and at least a moving waveguide and/or a fixed waveguide. The first driver unit includes a cone diaphragm and is configured to output sound mainly in a first frequency range. The second driver unit is configured to output sound mainly in a second frequency range that is higher than the first frequency range.

23 Claims, 11 Drawing Sheets

COAXIAL LOUDSPEAKER USES WAVEGUIDE STRUCTURES TO SHAPE HOW SOUND SPREADS OUT CROSS REFERENCE TO RELATED APPLICATIONS

CROSS REFERENCE TO RELATED APPLICATIONS

This application claims priority of U.S. Provisional Application No. 63/595,057 filed on Nov. 1, 2023 under 35 U.S.C. § 119 (e), the entire contents of all of which are hereby incorporated by reference.

TECHNICAL FIELD

The invention relates to a coaxial loudspeaker.

BACKGROUND

Coaxial loudspeakers, which house both a high-frequency driver (tweeter) and a low/mid-frequency driver (woofer) along the same axis, offer the benefit of broad frequency range reproduction in a compact form.

Waveguides, commonly used in such loudspeakers containing a compression driver as the high frequency driver, direct the high-frequency sound pressure waves in a certain pattern and improve the impedance matching of the pressure at the compression driver diaphragm to the open air. Typical waveguides consist of an axis-symmetric continuous flare, or two different flare shapes with the same flare positioned opposite, so that the waveguide is symmetric in two dimensions. Often these waveguides are designed to achieve a specific directivity pattern in the vertical and horizontal planes on-axis in relation to the loudspeaker position.

Conventional waveguides typically have two dimensions of symmetry in the horizontal plane and the vertical plane, which limits their ability to achieve different directivity patterns at the bottom of the coaxial loudspeaker horizontal axis compared to the top of the horizontal axis when the coaxial loudspeaker is elevated with respect to the horizontal axis. As a result, the conventional designs cannot provide variety of directivity patterns in relation to the loudspeaker's height position.

Additionally, existing coaxial loudspeakers with moving waveguides—designed to move in sync with the woofer's cone diaphragm—might be prone to generating unwanted noise due to the movement of the waveguide.

SUMMARY OF THE INVENTION

The present invention addresses at least one of these drawbacks.

The above objective is achieved, and the present invention is defined by the appended claims.

A coaxial loudspeaker according to one example of the present disclosure and invention includes: first and second driver units that individually radiate sound from a same axis, the first driver unit comprising a cone diaphragm and being configured to output sound mainly in a first frequency range; the second driver unit being configured to output sound mainly in a second frequency range that is higher than the first frequency range, comprising: a fixed waveguide configured to guide the sound in the second frequency range from the second driver unit; wherein the fixed waveguide has a mouth part at an outer edge of the fixed waveguide, a throat part at one end, and at least three flared surfaces comprising a first flared surface, a second flared surface and a third flared surface each extending from the throat part to the mouth part of the fixed waveguide, wherein the at least three flared surfaces have different shapes from each other.

A coaxial loudspeaker according to an preferable example of the present disclosure and invention includes: first and second driver units that individually radiate sound from a same axis, the first driver unit comprising a cone diaphragm and a voice coil and being configured to output sound mainly in a first frequency range, the second driver unit being configured to output sound mainly in a second frequency range that is higher than the first frequency range, comprising: a moving waveguide configured to guide the sound in the second frequency range from the second driver unit, the moving waveguide being attached to, or integrated with, a main surface of the cone diaphragm so as to move in sync with the cone diaphragm; a tube element configured to guide the sound from the second driver unit to the moving waveguide; and a radial gap being formed between the tube element and the voice coil, wherein the moving waveguide has an extension portion positioned in the radial gap and movable within the radial gap and along the axis.

In one aspect of the present invention, a coaxial loudspeaker is capable of achieving varying directivity patterns at different positions of the horizontal axis when the loudspeaker is elevated. This results in improved directivity control and better overall acoustic performance.

In another aspect of the present invention, a coaxial loudspeaker is capable of reducing noise associated with moving waveguides.

Further advantages of the examples of the present invention are described in the following also with regard to the attached drawings.

BRIEF DESCRIPTION OF THE DRAWINGS

The present invention is described, by way of examples and for solely helping understanding of the invention, with reference to the accompanying drawings, in which.

DESCRIPTION OF EMBODIMENTS

Embodiment 1

Figure 1:
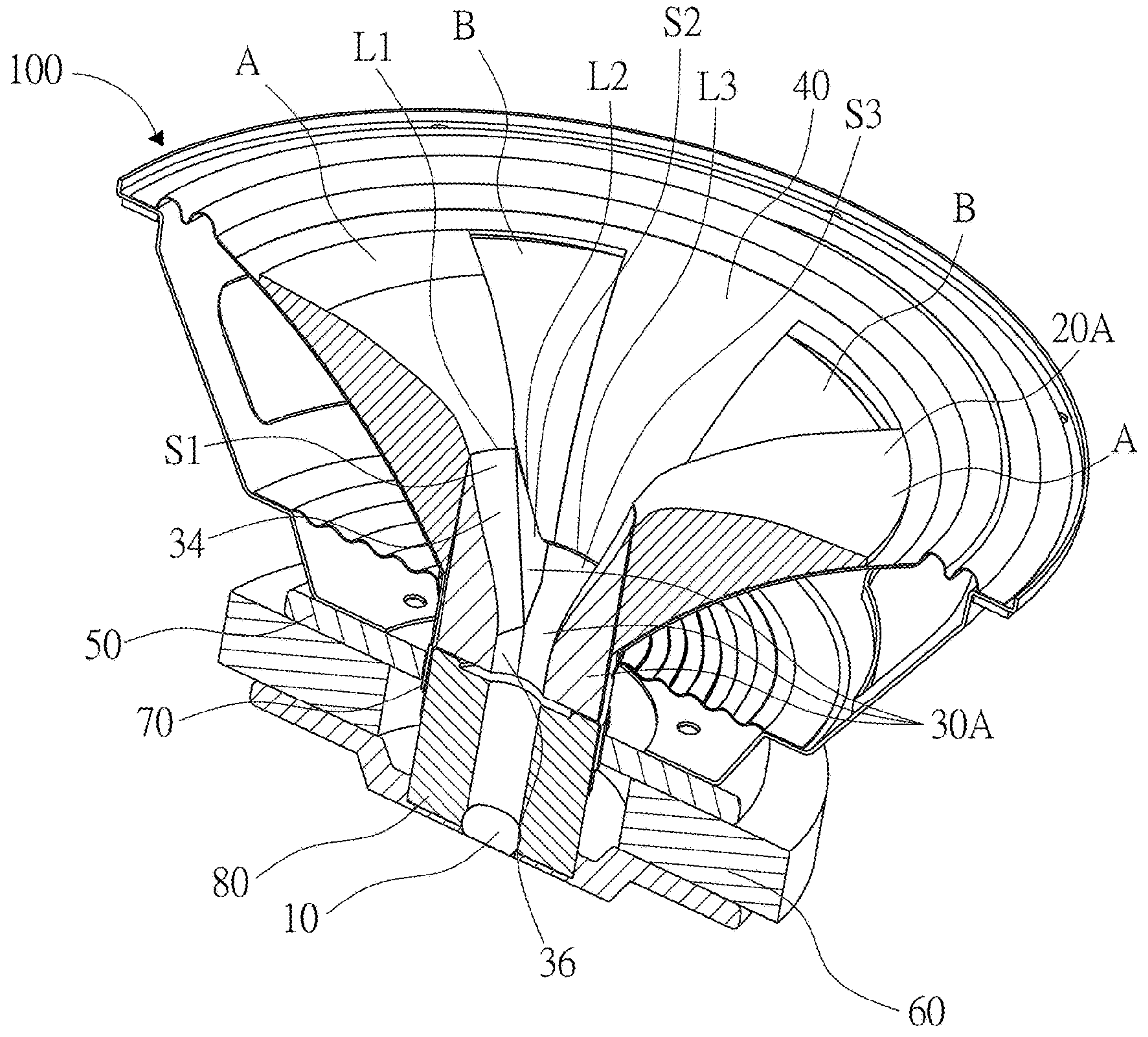
FIG. 1 shows a cross-sectional view of a coaxial loudspeaker along an axis according to Embodiment 1 of the present invention.
Figure 1A:
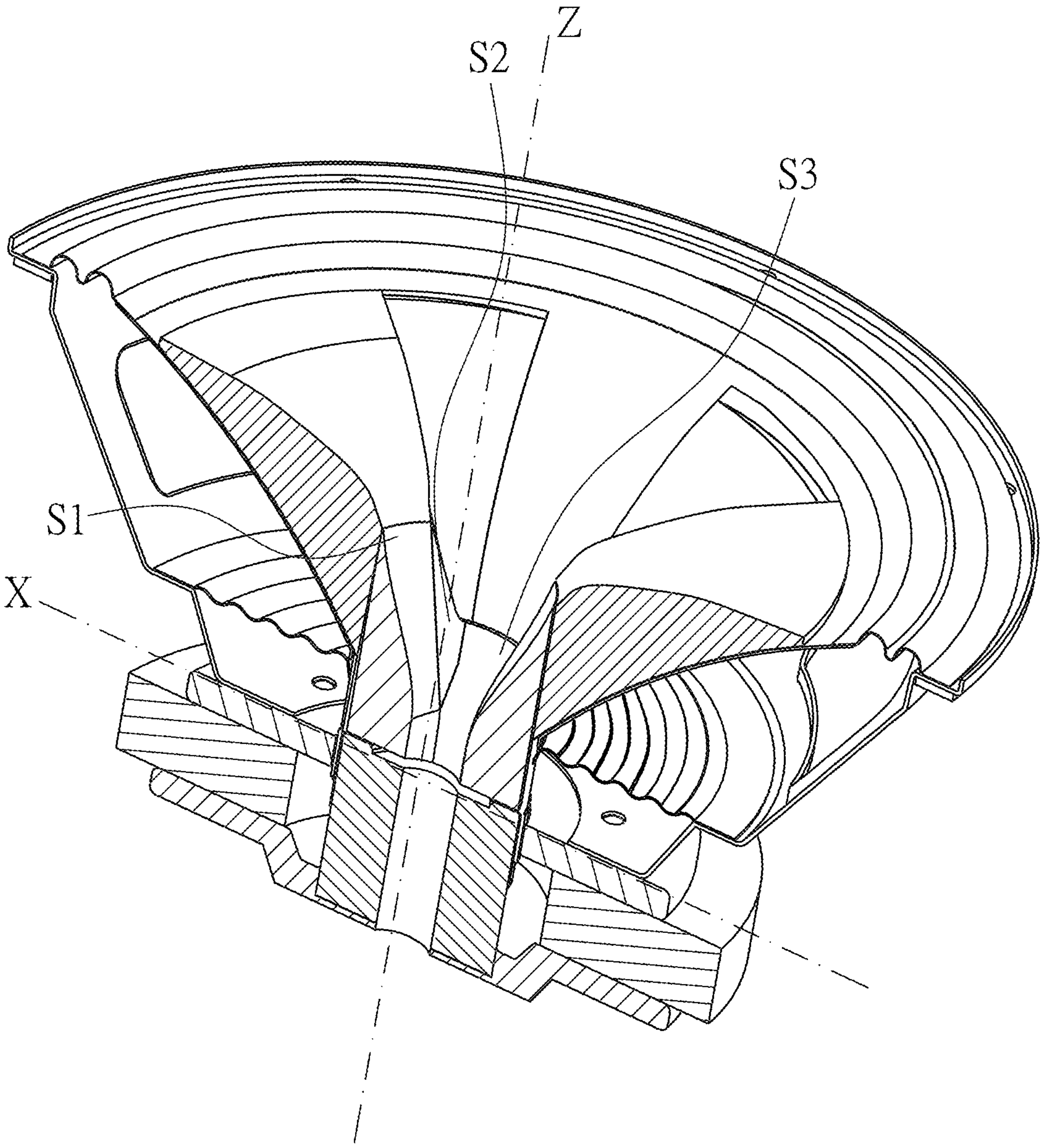
FIG. 1A illustrates a fixed waveguide with flared surfaces having different shapes from each other.

In more detail, FIGS. 1 and 1A show a coaxial loudspeaker 100 comprising a first driver unit and a second driver unit each radiating sound from the same axis Z.

The first driver unit comprises a cone diaphragm 40 and is configured to output sound mainly in a first frequency range. The first driver unit may also be referred to as low frequency driver or woofer. The first driver unit may cover a range from 40 Hz to 2000 Hz.

The second driver unit is configured to output sound mainly in a second frequency range that is higher than the first frequency range. The second driver unit may cover a range from 0.5 kHz to 20 kHz, preferably a range from 1 kHz to 20 kHz, more preferably a range from 2 kH to 20 KHz.

The first driver unit may comprise a magnet 60 and a voice coil 70. The voice coil 70 is attached to the cone diaphragm 40, preferably to the radially inner end of the cone diaphragm 40. The voice coil 70 may be made of copper or aluminum wire wound around a cylindrical former. When an electrical audio signal flows through the voice coil 70, it creates a magnetic field that interacts with the permanent magnet 60, causing the cone diaphragm 40 to move along the axis Z.

The magnet 60 provides the necessary magnetic field for the voice coil 70 to operate. The magnet 60 may be a ferrite magnet. Preferably, the magnet 60 is a neodymium magnet. The interaction between the magnetic field generated by the voice coil 70 and the static field of the magnet 60 causes the voice coil 70 and, thus, attached cone diaphragm 40 to move along the axis Z.

The coaxial loudspeaker 100 may further include one or more pole pieces. The pole piece is configured to direct and focus the magnetic field of the magnet 60 to effectively interact with the voice coil 70. The one or more pole pieces may include a T-shaped pole piece (which is also referred as to a T-iron 80). The T-shaped pole piece 80 has a flat and radial part, sitting either on the upper side or the lower side of the magnet; and an axial part extending from the radially inner end of the radial part and along the axis Z. The one or more pole pieces may also include a magnetic guide plate 50 positioned on the other side of the radial part of the T-shaped pole piece 80 so that the magnet 60 is interposed between the magnetic guide plate 50 and the radial part of the T-shaped pole piece 80.

The shapes and locations of these additional components including the magnet 60, voice coil 70, and the pole piece 50 are not essential elements for the present inventions and may, thus, be changed or modified in accordance with certain requirements.

The second driver unit 10 may comprise similar components to the first driver units to output sound in the second frequency, such as a magnet, a voice coil and a diaphragm (not shown). The second driver unit may include a compression driver in which the radiating diaphragm is larger than a horn throat to increase the radiation resistance.

The coaxial loudspeaker 100 further comprises a fixed waveguide 30A. The fixed waveguide 30A is configured to guide sound in the second frequency range from the second driver unit 10. The fixed waveguide 30A has a mouth part 34 at the outer edge of the fixed waveguide 30A, a throat part 36 at one end, and at least three flared surfaces including a first flared surface S1, a second flared surface S2 and a third flared surface S3 each extending from the throat part 36 to the mouth part 34. The fixed waveguide 30A, therefore, defines a passage for channeling sound from the second driver unit 10. The flared shape is a shape in which the width or diameter of the passage gradually increases from the throat part 36 to the mouth part 34. At least three flared surfaces have different shapes S1, S2, S3 from each other.

In the illustrated example as shown in FIG. 1 and FIG. 1A, the three adjacent flared surfaces S1, S2 and S3 have different shapes from each other. This arrangement allows different directivity patterns not only in the vertical and horizontal axis, but also in the horizontal plane at any elevated degree in between.

Preferably, the flared surfaces S1, S2, S3 have different flare angles from each other, with respect to the axis Z. Preferably, the flared surfaces S1, S2, S3 are at least partially convex curved surfaces. In a case where each flared surface is a convex curved surface, the flare angle is defined between the axis Z and the tangent line of the flared surface, the tangent line extending from a point on the axis z at the throat part 36 as shown in FIG. 1A.

Additionally or alternatively, the arc lengths at the outer edges of the mouth parts 34 of the flared surfaces S1, S2, S3 may differ from each other. Preferably, there is substantially no discontinuity between the outer edges of the adjacent flared surfaces S1, S2, S3. In one embodiment, each junction between the adjacent flared surfaces S1, S2, S3 may form a ridge line, in other words, adjacent surfaces S1, S2, S3 may connect each other at less than 180 degrees of dihedral angle. Preferably, the primary dihedral angle between the first flared surface S1 and the second flared surface S2 ranges from 80 to 150 degrees, preferably from 100 to 140 degrees, and/or the primary dihedral angle between the second flared surface S2 and the third flared surface S3 ranges from 70 to 130 degrees, preferably from 80 to 120 degrees. This ensures that the surfaces S1, S2, S3 assume a different acoustic directivity from each other.

In a preferable arrangement, the coaxial loudspeaker further includes two or more radial waveguides 20A. Each radial waveguide 20A extends in the radial direction of the cone diaphragm 40 from the mouth part 34 to the outer edge of the cone diaphragm 40. Preferably, the mouth part 34 of the fixed waveguide 30A may interface with the radial waveguides 20A. There may be substantially no discontinuity between the surfaces of the radial waveguides 20A and the flared surfaces S1, S2, S3 of the fixed waveguide 30A.

The radial waveguides 20A may be attached to a surface of the cone diaphragm 40, which is on the other side of the magnet, preferably by adhesive. Alternatively, the radial waveguides 20A may be integrated with the cone diaphragm 40. This allows for the radial waveguides 20A to move in sync with the cone diaphragm 40.

Each radial waveguide 20A may extend in the radial direction from the mouth part 34 of the fixed waveguide 30A to the outer edge of the cone diaphragm 40. In other words, a tangent to the radially inner end of the radial waveguide 20A and a tangent to the radially outer end of the flared surfaces S1, S2, S3 of the fixed waveguide 30A are substantially coincident or parallel to each other.

The contour of each radial waveguide 20A may extend substantially continuously from the mouth part 34 of the fixed waveguide 30A to outer edge of the cone diaphragm 40 when the cone diaphragm 40 of the first driver unit is at rest. In other words, a tangent to the radially inner end of the radial waveguide 20A and a tangent to the radially outer end of the flared surface S1, S2, S3 of the fixed waveguide 30A are substantially coincident or parallel to each other. The radial waveguides 20A may therefore be considered to be a 'moving' waveguide as, in use, it is non-static.

At least one of the radial waveguides 20A has two or more different flared portions. In FIG. 1, each radial waveguide 20A includes a first flared portion A and a second flared portion B.

The surfaces of the first flared portion A and the second flared portion B may have different curved surfaces from each other. The first flared portion A may extend in a substantially continuous radial direction from the first flared surface S1 of the fixed waveguide 30A to the outer edge of the cone diaphragm 40. The second flared portion B may extend in a substantially continuous radial direction from the second flared surface S2 of the fixed waveguide 30A to the outer edge of the cone diaphragm 40. That is, each of the first flared portion A and the second flared portion B corresponds to the first flared surface S1 and the second flared surface S2, respectively, where the intersection line between the first flared surface S1 and the first flared portion A is L1, and the intersection line between the second flared surface S2 and the second flared portion B is L2. Further, the intersection line between the third flared surface S3 and the cone diaphragm 40 is L3. Preferably, in the common plane of the intersection lines L1 and L2, the angle between the intersection line L1 and the intersection line L2 is 70 to 120 degrees, and/or in the common plane of the intersection lines L2 and L3, the angle between L2 and L3 is 90 to 150 degrees.

Preferably, the surfaces of the adjacent flared portions (e.g., the surfaces of the first and second flared portions A, B) are discontinuous from each other. The junction between two adjacent different-shape flared surfaces forms a ridge line. It means that there is a boundary between the flared surface of the first flared portion A and that of the second flared portion B. In other words, the curvature of adjacent flared portions A, B does not change continuously. Preferably, in one embodiment, the junction between the first flared portion A and the second flared portion B features at least one step or step structure. In other words, the thicknesses of the adjacent flared portions A, B at the junction differ from each other. This may create more reflection of sound. Preferably, the height of the junction interface, i.e., the height of the step between the adjacent first and second flared portions A, B gradually increases at least from the outer edge of the cone diaphragm 40 to the radially inner most, thickest position of the first flared portion A. This may create more distinctive variant of the reflection of sound.

Each radial waveguide 20A may be shaped in a circular sector in plan view, which has an outer arc, an inner arc and two radii connecting these two arcs. Preferably, each outer arc of the radial waveguide 20A is adjacent and aligned/flushed with the outer edge of the cone diaphragm 40.

Preferably, each radial waveguide 20A may contain or be made of foam polypropylene (FPP) material. Such a material is lightweight, which in turn has less adverse effect on the movement of the cone diaphragm 40, as well as easy to form. Each radial waveguide 20A may be attached to the surface of the cone diaphragm 40. If the surfaces of the first flared portion A and the second flared portion B are discontinuous from each other and/or the surfaces of the first and second flared portions A, B have different curve shapes, more reflection may be expected. Each of the first and second flared portion A, B has a different surface curvature. Preferably, the maximum surface curvature of the first flared portion A is greater than the maximum surface curvature of the second flared portion B. In addition, the central angle of the first flared portion A is greater than the central angle of the second flared portion B when viewed in the axis Z, i.e., in the top view.

Also, the coaxial loudspeaker 100 including the radial waveguide 20A, in combination with the fixed waveguide 30A can produce sound waves covering all ranges of audio sounds.

First Modification of Embodiment 1

Figure 2:
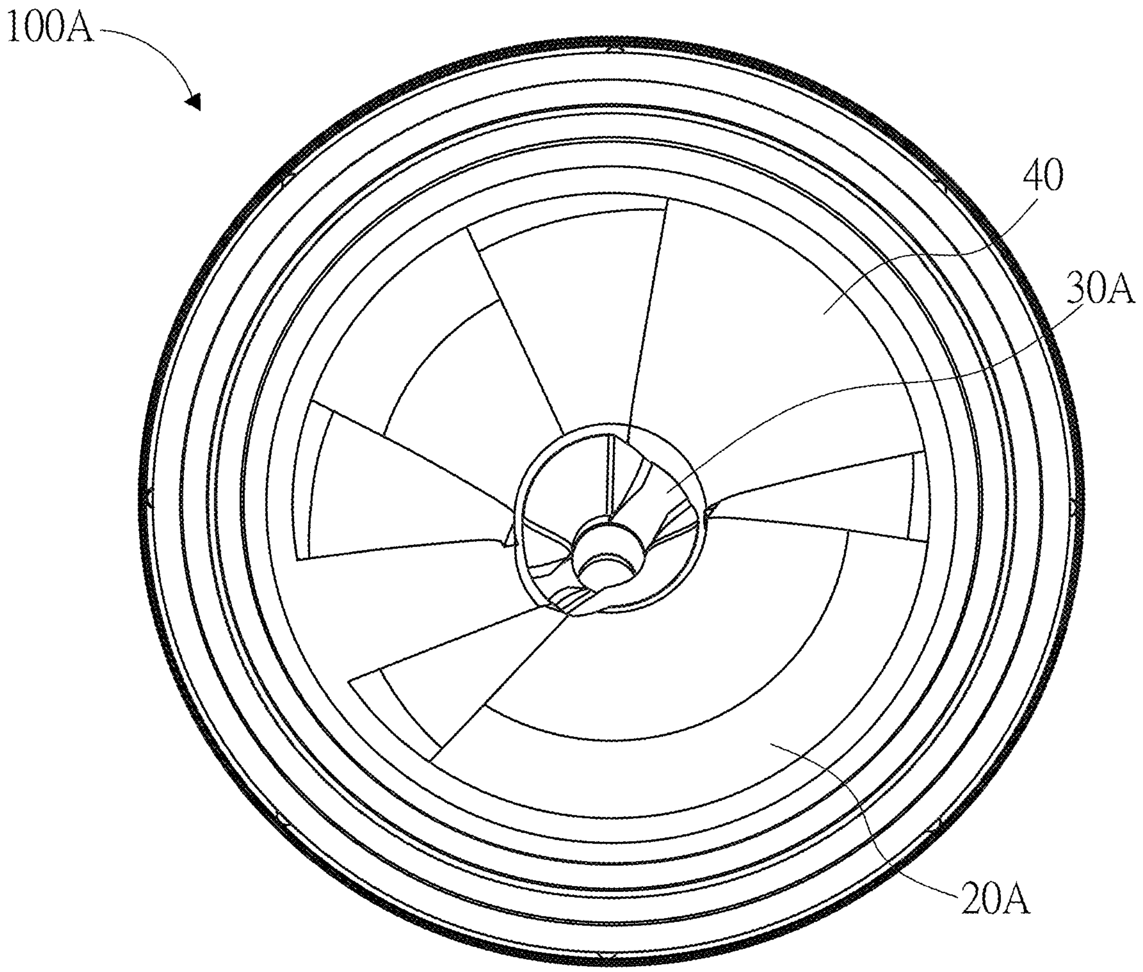
FIG. 2 shows a variant according to Embodiment 1 of the present invention.

FIG. 2 shows a variant according to Embodiment 1. In detail, a coaxial loudspeaker 100A has a similar structure to that of the coaxial loudspeaker 100 of FIG. 1 and includes a fixed waveguide 30A and two radial waveguides 20A arranged on the cone diaphragm 40.

In this variant, the two radial waveguides 20A are asymmetrical to each other. The central angles of the two radial waveguides 20A may differ from each other, the radial waveguides 20A have a different number of flared portions, and/or the flared portions have different flared surfaces from each other. This arrangement may further offset the directivity of sounds from the on-axis plane.

Second Modification of Embodiment 1

Figure 3:
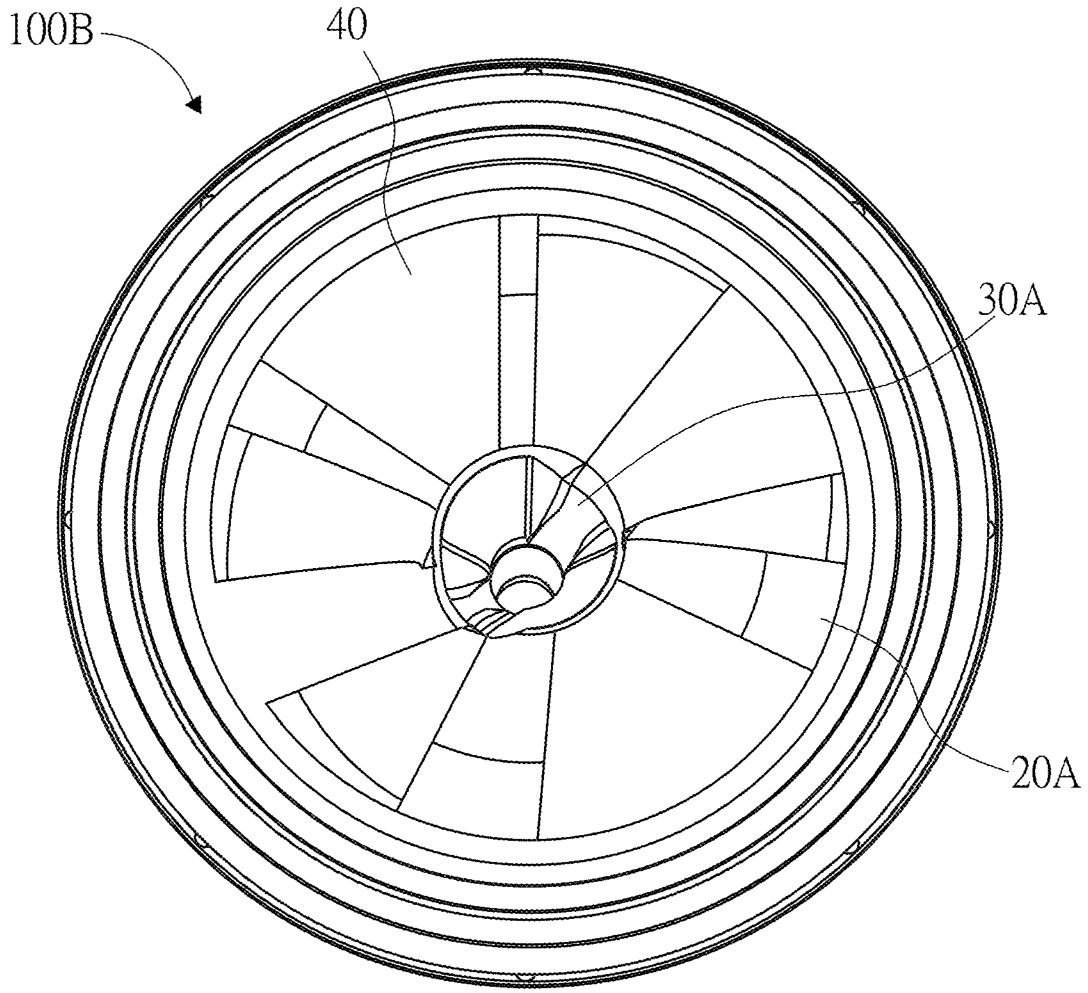
FIG. 3 shows another variant according to Embodiment 1 of the present invention.

FIG. 3 shows another variant according to Embodiment 1. In detail, a coaxial loudspeaker 100B has a similar structure to that of the coaxial loudspeaker 100 of FIG. 1 and includes a fixed waveguide 30A and radial waveguides 20A arranged on the cone diaphragm 40.

In this variant, the coaxial loudspeaker 100B comprises more than two radial waveguides 20A. In FIG. 3, the coaxial loudspeaker 100B includes four radial waveguides 20A. Preferably, these radial waveguides 20A have different shapes from each other. The central angles of the two radial waveguides 20A may be the same or differ from each other, the radial waveguides 20A have a different number of flared portions, and/or the flared portions have different flared surfaces from each other. This arrangement may further offset the directivity of sounds from the on-axis plane.

Third Modification of Embodiment 1

Figure 4:
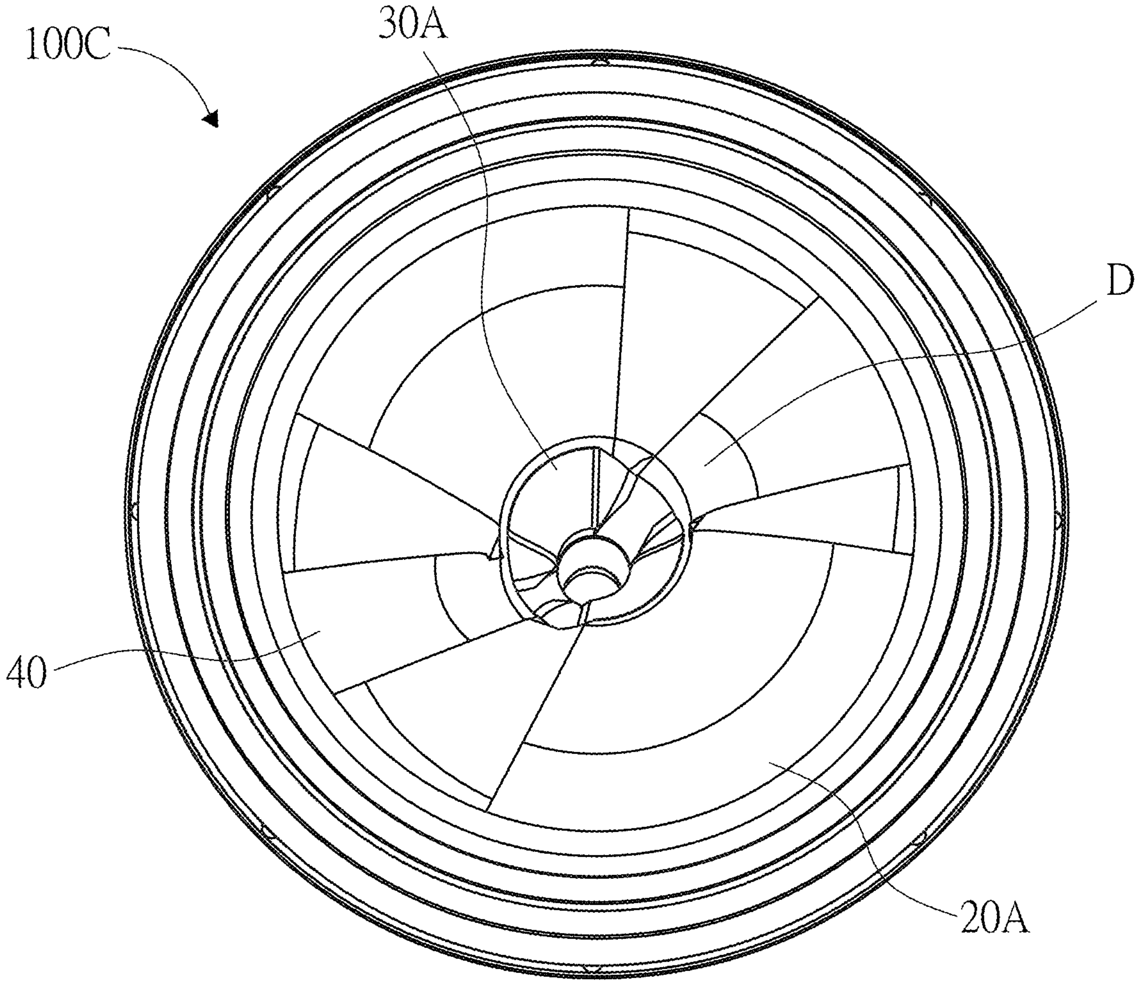
FIG. 4 shows yet another variant according to Embodiment 1 of the present invention.

FIG. 4 shows yet another variant according to Embodiment 1. In detail, a coaxial loudspeaker 100C has a similar structure to that of the coaxial loudspeaker 100 of FIG. 1 and includes a fixed waveguide 30A and two radial waveguides 20A. In this variant, the two radial waveguides 20A are connected each other by one or more links D. The two radial waveguides are thus integrated into a one piece. Further, the two identical radial waveguides 20A are symmetrically positioned along a diameter, and each of the two radial waveguides 20A has one first flared portion A and two second flared portions B, wherein the shape and size of the two second flared portions B are the same as each other, and they are located on either side of and adjacent to the first flared portion A.

The fixed waveguide 30A has different flared surfaces including at least two first flared surfaces S1, four second flared surfaces S2 and two third flared surfaces S3.

Preferably, the one or more links D are made of the same material from that of the radial waveguides 20A. Preferably, both the radial waveguides and links D are made of foam polypropylene (FPP). Such a one-piece waveguide is easy to manufacture and easy to assemble to the cone diaphragm 40.

Embodiment 2

Figure 5:
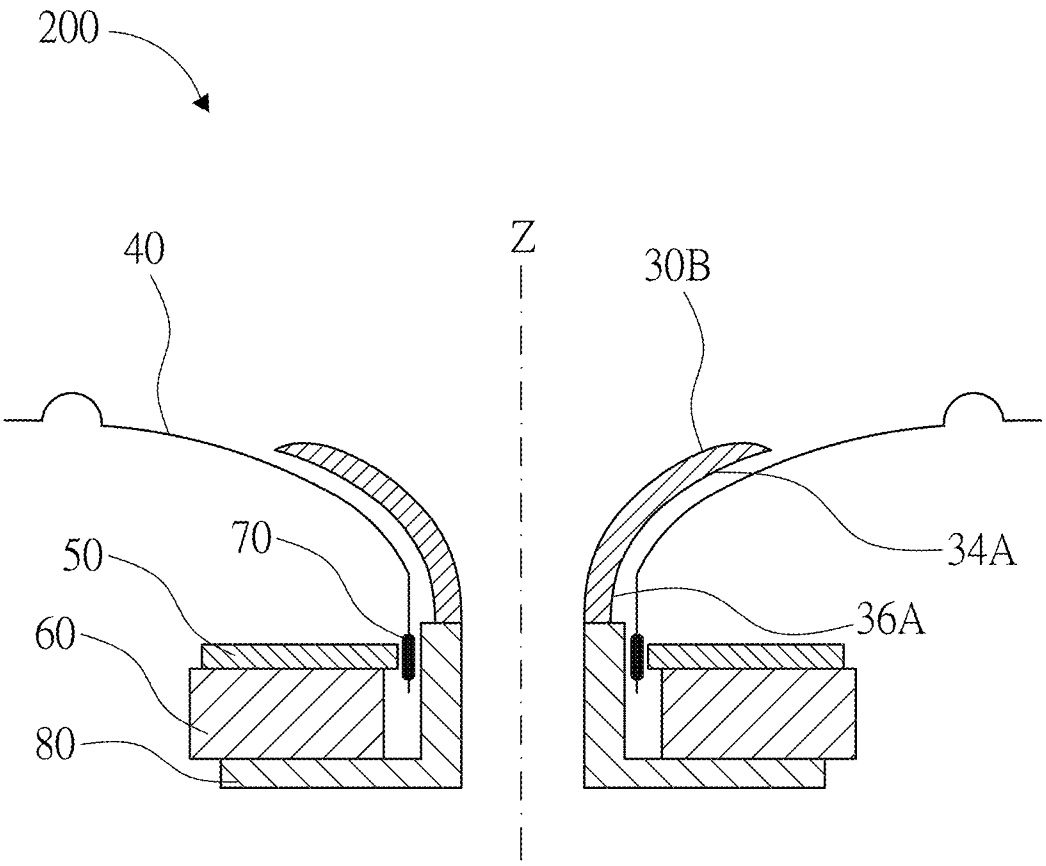
FIG. 5 shows a cross-sectional view of a coaxial loudspeaker with a fixed waveguide having a flared horn structure according to Embodiment 2 of the present invention.

FIG. 5 shows another coaxial loudspeaker 200 according to Embodiment 2 of the present invention.

Embodiment 2 differs from Embodiment 1 in that the coaxial loudspeaker 200 includes an isolated or independent fixed waveguide 30B having a flared hone structure. In Embodiment 2, parts that are common to Embodiment 1 are denoted by the same reference symbols, and descriptions thereof are omitted. Further, features that are different from Embodiment 1 are mainly described.

Figure 5A:
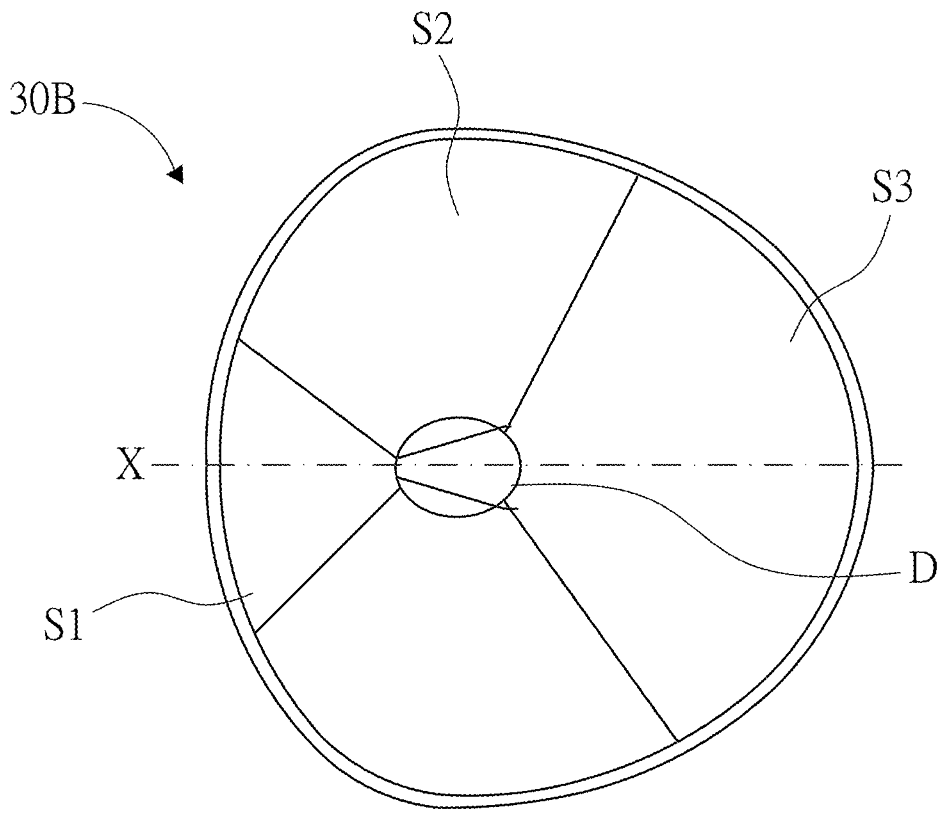
FIG. 5A shows a plan view of the fixed waveguide.

The isolated fixed waveguide 30B has a mouth part 34A at the outer edge of the fixed waveguide 30B, and a throat part 36A at one end. As shown in FIG. 5A, the isolated fixed waveguide 30B comprises at least three different flared surfaces including a first flared surface S1, a second flared surface S2 and a third flared surface S3. These flared surfaces S1, S2, S3 have different shapes from each other, similar to the fixed waveguide in the Embodiment 1. Each flared surface S1, S2, S3 extends from the throat part 36A to the outer edge of the mouth part 34A of the fixed waveguide 30B.

This arrangement allows different directivity patterns not only in the vertical and horizontal axis, but also in the horizontal plane at any elevated degrees in between.

Preferably, the height of the mouth part 34A of the fixed waveguide 30B is at least more than half the height of the cone diaphragm 40. More preferably, the height of the mouth part 34A of the fixed waveguide 30B is equal to or higher than the height of the cone diaphragm 40. Accordingly, a wider dispersion can be achieved.

As shown in FIG. 5 and FIG. 5A, the throat part 36A of the fixed waveguide 30B has a unique shape in the horizontal cross-section and constitutes a slit aperture AP, which preferably is symmetric in only one plane along the axis Z. In one embodiment, the shape of the slit aperture AP may be approximately a fan shape or a waterdrop shape in cross section along a plane perpendicular to the axis Z. This asymmetry produces different patterns of directivity at different angles of elevation to the horizontal plane and affects mostly the high frequency range.

As further illustrated in FIG. 5A, the horizontal cross-sectional shape of the fixed waveguide 30B is symmetric up and down, but asymmetric left and right, which is symmetric in one plane only.

Preferably, junctions between two adjacent different-shape flared surfaces are formed by smooth surfaces. In other words, the curvature of adjacent flare surfaces changes continuously.

The lower end of the fixed waveguide 30B may be attached to the pole piece of the first driver unit, e.g., to the T-iron 80.

Preferably, the mouth part 34A of the fixed waveguide 30B has a flared surface design extending from the throat part 36A of the fixed waveguide 30B, along the main surface of the cone diaphragm 40, whilst maintaining a certain gap with respect to the main surface of the cone diaphragm 40. In other words, there is a space between the cone diaphragm 40 and the fixed waveguide 30B.

This embodiment achieves different directivity patterns not only in the vertical and horizontal axis, but also in the horizontal plane at any elevated degrees in between, by just a one-piece fixed waveguide, because the shape of the fixed waveguide 30B is unique and without 2 planes of symmetry.

Preferably, the fixed waveguide 30B has a one-piece structure. The unique 3D shape of the fixed waveguide 30B is symmetric in one plane only which allows different directivity patterns in the horizontal plane at different elevations to the horizontal axis, as well as the vertical plane. The fixed waveguide 30B may be shaped as a flared horn with a narrow entrance and a wider exit, like trumpet shape.

The throat part 36A of the fixed waveguide 30B constitutes the small-slit aperture AP which is symmetric in one plane only. The asymmetry creates different patterns of directivity at different angles of elevation to the horizontal plane and affects mostly the high frequency range.

The fixed waveguide 30B comprises at least three different-shape flared surfaces S1, S2, S3. When the coaxial loudspeaker 200 is elevated with respect to the horizontal plane, the combination of the three different-shape flared surface S1, S2, S3 achieves two different horizontal directivities and affect mostly the mid-range, preferably 500-2000 Hz.

The combination of these three different-shape flared surfaces within a one-part fixed waveguide 30B form a unique design with only one plane of symmetry, ensuring different horizontal directivities across the frequency range when the loudspeaker is elevated with respect to the horizontal plane.

First Modification of Embodiment 2

Figure 5B:
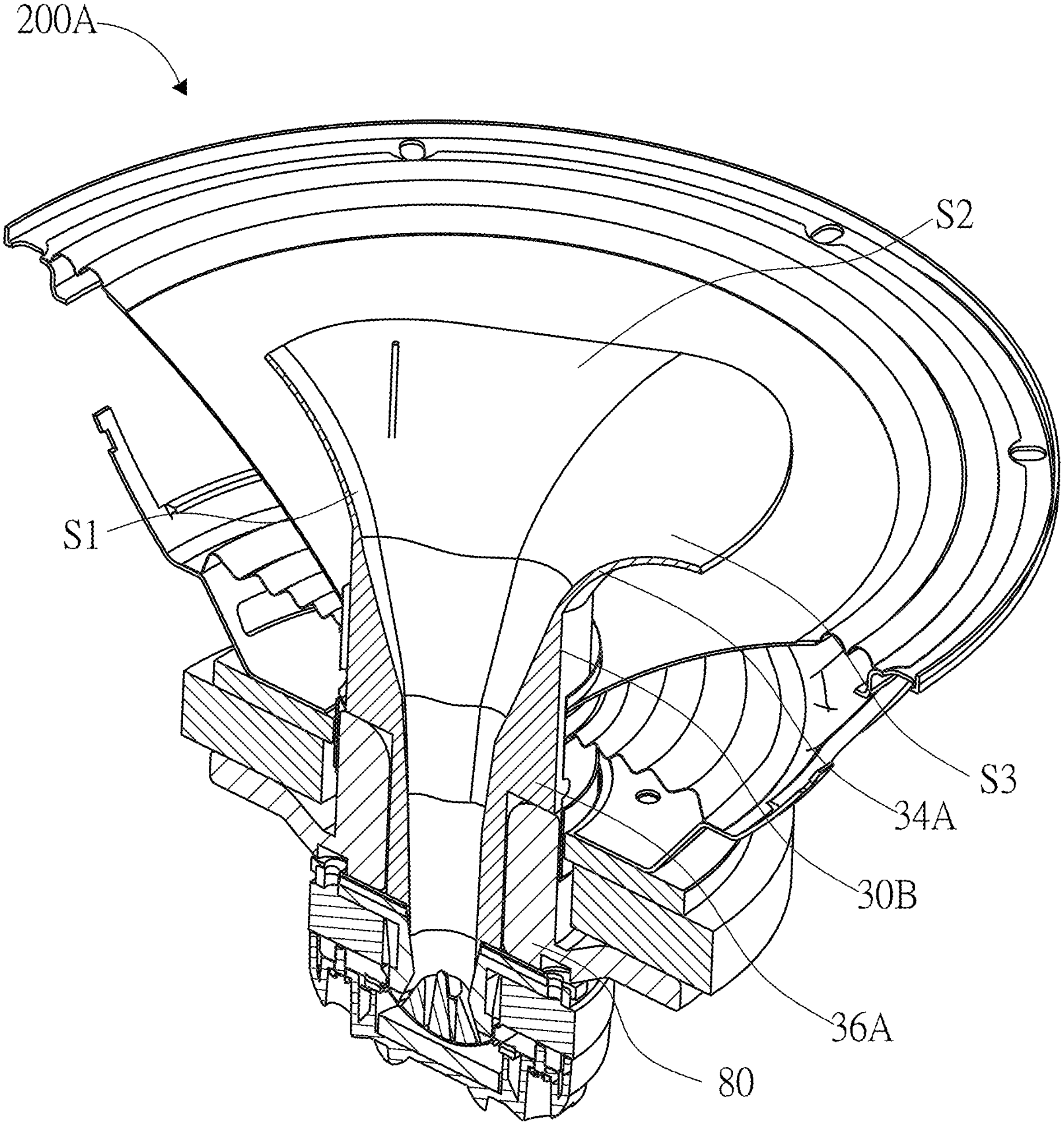
FIG. 5B shows a variant according to Embodiment 2 of the present invention.

FIG. 5B shows a variant according to Embodiment 2. In detail, a coaxial loudspeaker 200A has a similar structure to that of the coaxial loudspeaker 200 of FIG. 5.

In this variant, the isolated fixed waveguide 30B has a mouth part 34A at the outer edge of the fixed waveguide 30B, and a throat part 36A at one end. As shown in FIG. 5B, the isolated fixed waveguide 30B comprises at least three different flared surfaces including a first flared surface S1, a second flared surface S2 and a third flared surface S3. Each flared surface S1, S2, S3 extends from the throat part 36A to the outer edge of the mouth part 34A of the fixed waveguide 30B. Preferably, the outer edges of flared surfaces S1, S2, and S3 are co-planar. Different from the embodiment of FIG. 5, in this embodiment, at least a portion of the throat part 36A is located within an inner diameter of a pole piece (e.g., the T-iron 80), and the thickness of the fixed waveguide 30B gradually decreases from the throat part 36A to the mouth part 34A. This provides a robust structure for the fixed waveguide 30B. The fixed waveguide 30B may be fixed to the pole piece (e.g., the T-iron 80) by an adhesive or ultrasonic bonding, or the fixed waveguide 30B may be injection-molded on the pole piece as a mold insert.

Embodiment 3

Figure 6:
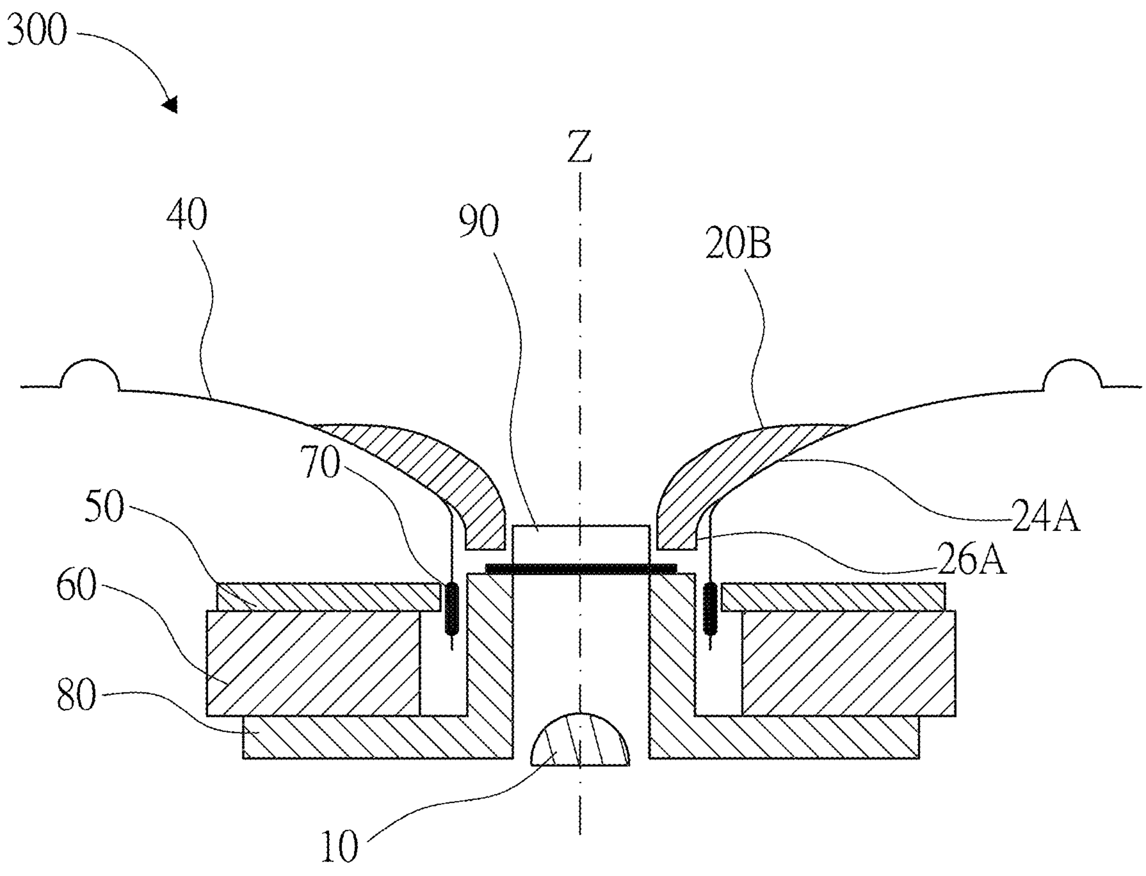
FIG. 6 shows a cross-sectional view of a coaxial loudspeaker according to Embodiment 3 of the present invention.

FIG. 6 is another coaxial loudspeaker 300 according to Embodiment 3 of the present invention. Embodiment 3 differs from Embodiment 1 in that the coaxial loudspeaker 300 includes a moving waveguide 20B instead of the radial waveguide 20A and a tube element 90 instead of the fixed waveguide 30A. In Embodiment 3, parts that are common to Embodiment 1 are denoted by the same reference symbols, and descriptions thereof are omitted. Further, features that are different from Embodiment 1 are mainly described. Preferably, the tube element 90 is an aluminum tube. Preferably, the overall wall thickness of the tube element 90 is uniform. The tube element 90 may be arranged above the T-iron 80 so that the tube element 90 defines a further passage for channeling sound from the second driver unit 10. Importantly, a radial gap is created between the voice coil 70 and the tube element 90.

The moving waveguide 20B has a main body portion 24A (mouth part) that is attached to the surface of the cone diaphragm 40 or integrated with it and an extension portion 26A (throat part), which is a portion that is apart from the main surface of the cone diaphragm 40. The extension portion 26A is positioned in the radial gap. For example, at least a portion of the extension portion 26A is located between the voice coil 70 and the tube element 90, allowing the extension portion 26A to be movable within the radial gap and along the axis Z. In other words, the extension portion 26A can move up and down in the radial gap, and the moving waveguide 20B can move in sync with the cone diaphragm 40. The extension portion 26A guides the movement of the cone diaphragm 40 along the axis Z, suppressing unwanted diaphragm movement and noise due to the increased diaphragm weight with the movable waveguide 20B. The extension portion 26A may also function as a stopper of the cone diaphragm 40, which is particularly beneficial when transporting the loudspeaker. Damage to the diaphragm during transportation can be reduced or prevented. The moving waveguide 20B, together with the tube element 90, can help guide and transmit the sound from the second driver unit 10. Also, the coaxial loudspeaker 300, including the moving waveguide 20B, in combination with the tube element 90, can produce sound waves covering all ranges of audio sounds.

The moving waveguide 20B may feature a flared horn structure, with its outer edge of the main body portion 24A generally extending in a substantially continuous radial direction from the extension portion 26A of the moving waveguide 20B and attached to the surface of the cone diaphragm 40 or integrated with it. The moving waveguide 20B is arranged to move in sync with the cone diaphragm 40. The flared horn structure is shaped like a conical cylinder with a narrow entrance and a wider exit, like trumpet shape.

In Embodiment 3 of the present invention, the extension portion 26A of the moving waveguide 20B is positioned in the gap between the tube element 90 and the voice coil 70. The function of the tube element 90 is similar to the fixed waveguide, and the tube element 90 is used to propagate high-frequency sound from the second driver unit 10 to the moving waveguide 20B.

Preferably, the main body portion 24A of the moving waveguide 20B comprises at least three different-shape flared surfaces, each extending from the extension portion 26A to the outer edge of the main body portion 24A. As a result, the combination of these three different-shape flared surfaces within a one-part main body of the moving waveguide 20B form a unique design with only one plane of symmetry and ensure that different horizontal directivities can be maintained across the frequency range when the loudspeaker is elevated with respect to the horizontal plane.

Preferably, the moving waveguide 20B is made of paper material, e.g., pulp material. Additionally or alternatively, the thickness of the moving waveguide 20B may be 1 mm or less than 1 mm. This allows a lightweight and compact loudspeaker. The moving waveguide 20B may be attached by glue bounding, which is commonly used for dust cover attachment.

Alternatively, the moving waveguide 20B may contain or be made of foam polypropylene (FPP) material. This allows a lightweight and robust loudspeaker.

First Modification of Embodiment 3

Figure 6A:
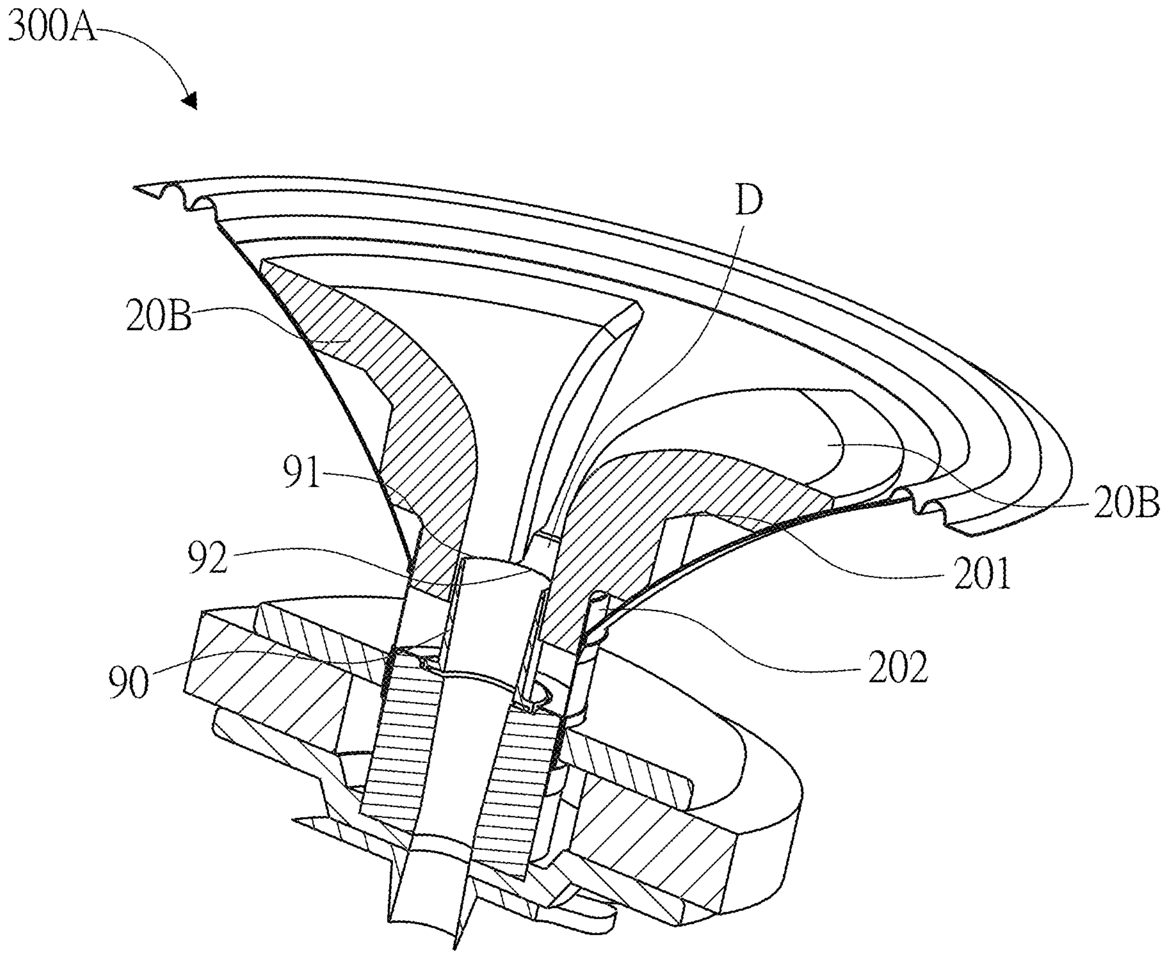
FIG. 6A shows a variant according to Embodiment 3 of the present invention.

FIG. 6A show a variant according to Embodiment 3. In detail, a coaxial loudspeaker 300A has a similar structure to that of the coaxial loudspeaker 300 of FIG. 6.

In this variant, at least two moving waveguides 20B are arranged to each other. The two moving waveguides 20B are connected each other by one or more links D. The two moving waveguides are thus integrated into one piece. Preferably, the height of the main body portion 24A of the moving waveguide 20B is at least more than half the height of the cone diaphragm 40. The moving waveguides 20B are arranged to surround a mouth part 92 of the tube element 90 and a junction between the tube element 90 and the moving waveguides 20B features at least one step structure 91 which is generated by the thickness of the tube element 90. This may create more reflection of sound.

Preferably, the one or more links are made of the same material from that of the moving waveguides 20B. Preferably, both the moving waveguides and links D are made of foam polypropylene (FPP). Such a one-piece waveguide is easy to manufacture and easy to assemble to the cone diaphragm 40.

Preferably, at least one moving waveguide 20B has at least one recessed structure on the side facing the cone diaphragm 40. This allows the weight of the moving waveguides 20B to be reduced without affecting the desired acoustic properties. Preferably, each moving waveguide 20B has two or more recessed structures on the side facing the cone diaphragm 40, e.g., a first recessed structure 201 and a second recessed structure 202. More preferably, the two or more recessed structures 201, 202 in each moving waveguide 20B are adjacent to each other in the radial direction of the cone diaphragm 40. More preferably, the recessed volume of the first recessed structure 201 located radially outwards is greater than the recessed volume of the second recessed structure 202 located radially innerwards. The volume and location of such recessed structures 201, 202 may be designed to ensure balanced weight distribution among the two or more moving waveguides 20B, and thus weight uniformity of the cone diaphragm 40 including the waveguides 20B. Notably, the surfaces of the first recessed structure 201 and the second recessed structure 202 both do not come into contact with the surface of the cone diaphragm 40.

Second Modification of Embodiment 3

Figure 6B:
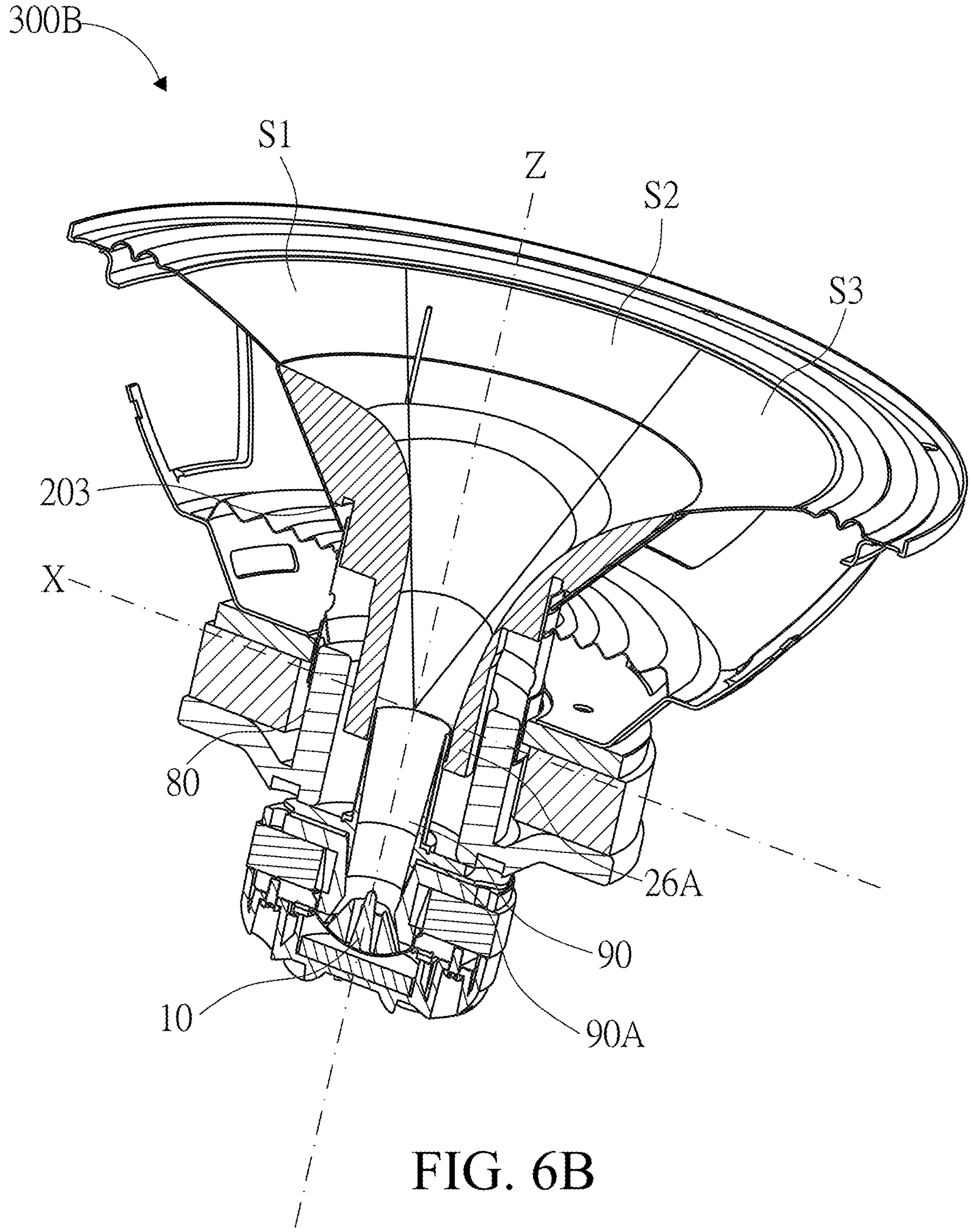
FIG. 6B shows another variant according to Embodiment 3 of the present invention.

FIG. 6B shows another variant according to Embodiment 3. In detail, a coaxial loudspeaker 300B has a similar structure to that of the coaxial loudspeaker 300 of FIG. 6.

In this variant, the tube element 90 may be inserted and positioned within the axial part of the T-iron 80. Thus, the extension portion 26A of the moving waveguide 20B (i.e., lower part of the moving waveguide 20B) is positioned in the gap between the tube element 90 and the axial part of the T-iron 80. The function of the tube element 90 is similar to the fixed waveguide, and the tube element 90 is used to propagate high-frequency sound from the second driver unit 10 to the moving waveguide 20B. The extension portion 26A may also function as a stopper of the cone diaphragm 40, which is particularly beneficial when transporting the loudspeaker. Damage to the diaphragm during transportation can be reduced or prevented.

Similarly to the recessed structures 201, 202 in the embodiment of FIG. 6A, the surface of the moving waveguides 20B, which faces the cone diaphragm 40, has at least one recessed structure 203. The moving waveguides 20B may have two or more recessed structures adjacent each other in the radial direction of cone diaphragm 40, as discussed above. Notably, the surface of this recessed structure 203 does not come into contact with the surface of the cone diaphragm 40.

Preferably, the tube element 90 further has a radial extending structure (disc structure) 90A, which is used to secure the tube element 90 to the T-iron 80.

| Reference sign list | |
|---|---|
| 100, 100A, 100B, 100C, 200, 200A, 300, 300A, 300B | coaxial loudspeaker |
| 20A, 20B | radial (moving) waveguide |
| 30A, 30B | fixed waveguide |
| 10 | high frequency driver |
| 40 | cone diaphragm |
| 50 | magnetic guide plate |
| 60 | magnet |
| 70 | voice coil |
| 80 | T-iron |
| 90 | tube element (aluminum tube) |

The invention claimed is:

1. A coaxial loudspeaker, comprising:

first driver unit comprising a cone diaphragm and being configured to output sound mainly in a first frequency range;

a second driver unit configured to output sound mainly in a second frequency range that is higher than the first frequency range, the second driving unit comprising a fixed waveguide configured to guide the sound in the second frequency range from the second driver unit, the fixed waveguide comprising:

a mouth part at an outer edge of the fixed waveguide;

a throat part at one end of the fixed waveguide; and at least three flared surfaces comprising a first flared surface, a second flared surface and a third flared surface each extending from the throat part to the mouth part of the fixed waveguide, and the at least three flared surfaces having different shapes from each other, wherein the first driver unit and the second driver unit individually radiate sound from a same axis.

2. The coaxial loudspeaker of claim 1, further comprising two or more radial waveguides, wherein each radial waveguide extends in a radial direction from the mouth part of the fixed waveguide to an outer edge of the cone diaphragm and has a flared surface.

3. The coaxial loudspeaker of claim 2, wherein the radial waveguides are attached to, or integrated with, a main surface of the cone diaphragm.

4. The coaxial loudspeaker of claim 2, wherein each radial waveguide is arranged to move in sync with the cone diaphragm.

5. The coaxial loudspeaker of claim 2, wherein a contour of the radial waveguide extends continuously from the mouth part of the fixed waveguide when the cone diaphragm is at rest.

6. The coaxial loudspeaker of claim 2, wherein each radial waveguide comprises two or more flared portions including a first flared portion and a second flared portion, surfaces of adjacent flared portions being discontinuous from each other, and a junction between the adjacent flared portions featuring at least one step structure.

7. The coaxial loudspeaker of any one of claim 6, wherein the junction between the adjacent flared surfaces forms a ridge line, or the junction between adjacent flared surfaces forms a smooth surface.

8. The coaxial loudspeaker of claim 7, wherein a dihedral angle at the junction between the first flared surface and the second flared surface is within a range of 80 to 150 degrees, and/or a dihedral angle at the junction between the second flared surface and the third flared surface is within a range of 70 to 130 degrees.

9. The coaxial loudspeaker of any one of claim 6, wherein the first flared surface and the first flared portion connect each other at a first intersection line, the second flared surface and the second flared portion connect each other at a second intersection line, and the third flared surface and the cone diaphragm connect each other at a third intersection line, wherein in a common plane of the first and second intersection lines, an angle between the first and second intersection lines ranges from 70 to 120 degrees, and/or in a common plane of the second and third intersection lines, an angle between the first and second intersection lines ranges from 90 to 150 degrees.

10. The coaxial loudspeaker of claim 6, wherein each of the first and second flared portions has a different surface curvature, a maximum surface curvature of the first flared portion is greater than that of the second flared portion.

11. The coaxial loudspeaker of claim 10, further comprising a step between the first and second flared portions, wherein a height of the step gradually increases at least from the outer edge of the cone diaphragm to a radially inner most, thickest position of the first flared portion.

12. The coaxial loudspeaker of claim 1, wherein the fixed waveguide has a flared horn structure, wherein the fixed waveguide protrudes over a main surface of the cone diaphragm, wherein a height of the mouth part of the fixed waveguide is at least more than half a height of the cone diaphragm, and wherein the fixed waveguide has a symmetric cross section only in one plane along the axis.

13. The coaxial loudspeaker of claim 12, wherein the flared horn structure has a throat with a slit aperture, the slit aperture being symmetric only in one plane along the axis, and a shape of the slit aperture is a fan shape or a waterdrop shape.

14. The coaxial loudspeaker of claim 13, wherein the throat is fixed to a pole piece of the first driver unit.

15. The coaxial loudspeaker of claim 13, wherein at least part of the throat is located radially inner side of an axial part of the pole piece of the first driver unit.

16. The coaxial loudspeaker of claim 12, wherein the flared horn structure has a throat and at least a portion of the throat part of the fixed waveguide is located within an inner diameter of a pole piece.

17. The coaxial loudspeaker of claim 12, wherein the outer edges of the first flared surface, the second flared surface, and the third flared surface are co-planar.

18. A coaxial loudspeaker, comprising:

a first driver unit comprising a cone diaphragm and a voice coil and being configured to output sound mainly in a first frequency range; and a second driver unit configured to output sound mainly in a second frequency range that is higher than the first frequency range, comprising:

a moving waveguide configured to guide the sound in the second frequency range from the second driver unit, the moving waveguide being attached to, or integrated with, a main surface of the cone diaphragm so as to move in sync with the cone diaphragm;

a tube element configured to guide the sound from the second driver unit to the moving waveguide; and a radial gap being formed between the tube element and the voice coil, wherein the moving waveguide has an extension portion positioned in the radial gap and movable within the radial gap and along the axis, and wherein the first driver unit and the second driver unit individually radiate sound from a same axis.

19. The coaxial loudspeaker of claim 18, wherein the moving waveguide has at least one recessed structure on a side facing the cone diaphragm, the surface of the recessed structure does not come into contact with the surface of the cone diaphragm.

20. The coaxial loudspeaker of claim 19, wherein the moving waveguide has two or more recessed structure on the side facing the cone diaphragm, wherein the two or more recessed structures include a first recessed structure and a second recessed structure adjacent to each other in a radial direction of the cone diaphragm, and wherein a recessed volume of the first recessed structure located radially outwards is greater than a recessed volume of the second recessed structure located radially sinner wards.

21. The coaxial loudspeaker of claim 18, wherein the tube element further comprises a radial extending structure fixed on a pole piece.

22. The coaxial loudspeaker of claim 18, wherein the moving waveguide or the radial waveguides is at least partially made of foam polypropylene (FPP) material.

23. The coaxial loudspeaker of claim 18, wherein the moving waveguide or the radial waveguides is at least partially made of paper material.

* * * * *